United States Patent [19]

MacFarlane et al.

[11] Patent Number: 5,584,890
[45] Date of Patent: Dec. 17, 1996

[54] METHODS OF MAKING MULTIPLE ANODE CAPACITORS

[76] Inventors: Douglas R. MacFarlane, 157 Cochrane Street, Elsternwick, Victoria, Australia, 3185; Paul D. Lunsmann, 29 Ballast Point Road, Birchgrove, NSW, Australia, 2041

[21] Appl. No.: 377,750

[22] Filed: Jan. 24, 1995

[51] Int. Cl.$^6$ .................................................. H01G 9/042
[52] U.S. Cl. .................................................. 29/25.03
[58] Field of Search .................. 29/25.03; 361/502, 361/509, 529

[56] References Cited

U.S. PATENT DOCUMENTS

| | | | |
|---|---|---|---|
| 3,555,369 | 1/1971 | Yoshino | 317/230 |
| 3,883,784 | 5/1975 | Peck et al. | 317/258 |
| 4,907,130 | 3/1990 | Boulloy et al. | 29/25.03 |
| 4,942,501 | 7/1990 | McFarlane et al. | 361/523 |
| 5,055,975 | 10/1991 | Behrend | 361/527 |
| 5,131,388 | 7/1992 | Pless et al. | 128/419 |
| 5,146,391 | 9/1992 | McFarlane et al. | 361/525 |
| 5,153,820 | 10/1992 | McFarlane et al. | 361/525 |

FOREIGN PATENT DOCUMENTS

| | | |
|---|---|---|
| 0507315A1 | 10/1992 | European Pat. Off. |
| 3812475 | 11/1989 | Germany. |
| 03109711 | 5/1991 | Japan. |
| 03152916 | 6/1991 | Japan. |
| 04044305 | 5/1992 | Japan. |
| 04094110 | 7/1992 | Japan. |
| 04094108 | 7/1992 | Japan. |
| 04206621 | 11/1992 | Japan. |
| 05041338 | 6/1993 | Japan. |
| 06168855 | 6/1994 | Japan. |

OTHER PUBLICATIONS

Photoflash Electrolytic Capacitors, Their Development Over the Past Ten Years, Siemens Electronic Components Bulletin VIII, 1973 No. 4, pp. 96–99.

*Primary Examiner*—George Fourson
*Assistant Examiner*—Thomas G. Bilodeau
*Attorney, Agent, or Firm*—Gottlieb, Rackman & Reisman, P.C.

[57] ABSTRACT

A compact multiple anode electrolytic capacitor suitable for an implantable defibrillator includes three or more layers of an anode using a combination of tunnel etched anodes on the outer layer and a layer of highly etched foil with a solid core in the center. By means of this and similar multiple anode arrangements the capacitor achieves a smaller volume overall. The arrangement further allows the electrolyte and thus the conducting ions to reach the whole surface area of the anode, even pores which originate on the inner layer of the foil, yet at the same time the ions are not able to penetrate all the way through the foil. More layers of anode can be used in the sandwich depending on the desired electrical performance. The high energy density renders the capacitors highly suitable for use in technologically sophisticated biomedical electronic devices such as cardiac pacemakers and defibrillator implanted in the human body.

5 Claims, 6 Drawing Sheets

METHODS OF MAKING MULTIPLE ANODE CAPACITORS

BACKGROUND OF THE INVENTION

1. Technical Field

This invention relates to electrolytic capacitors. More particularly it relates to compact electrolytic capacitors that have a plurality of electrically conductive anodes, an electrically conductive cathode, and an electrolyte between the anodes and cathode. The invention also concerns a method for making such capacitors. While the applicability of the present invention is broad and general, for the sake of an orderly presentation, and to facilitate the comprehension of the principles of the invention, the description focuses principally on the structural characteristics of and manufacturing methods for capacitors which are designed to be used in implantable biomedical electronic devices such as defibrillators.

2. Background Art

Defibrillator designed for implantation inside the human body require associated power supplies which must be provided with a high capacitance in order to be able to deliver on demand intense bursts of current for very short time intervals. The battery used in defibrillator cannot deliver a large burst of energy, so an intermediate storage medium such as an electrolytic capacitor is used to accumulate the energy over a period of about 10 seconds and deliver it to the heart in about 5 milliseconds. Electrolytic capacitors are well suited for performing this function in biomedical electronic devices. Given the environment within which such a device is used, however, it is essential that the volume of the device be kept to an absolute minimum. Thus, since the capacitor in such a device ordinarily occupies as much as about 30% of the total volume of the device, considerable effort has been expended on the problem of reducing the size of the capacitor. Nevertheless, attempts to minimize the volume of electrolytic capacitors have met with only limited degrees of success, for a number of reasons.

1. GENERAL STRUCTURE

Prior art electrolytic capacitors generally include a laminate comprising an etched aluminum foil anode, an aluminum foil or film cathode, and an interposed kraft paper or fabric gauze spacer impregnated with a solvent-based liquid electrolyte. A layer of oxide is formed on the aluminum anode, preferably during passage of a current through the anode. The oxide layer functions as a dielectric layer interposed between the anode and the charge carriers of the dielectric medium. The entire laminate is rolled up into the form of a substantially cylindrical body and encased, with the aid of suitable insulation, in an aluminum tube or can and sealed with a rubber material.

2. NEED TO MAXIMIZE ANODE SURFACE AREA

The energy of the capacitor is stored in the electromagnetic field whose source is the opposite charges separated by the aluminum oxide on the anode. The energy stored is inversely proportional to the thickness of the aluminum oxide layer, and proportional to the surface area of the anode. Thus to minimize the overall volume of the capacitor one must maximize the anode surface area per unit volume without increasing its overall (i.e., external) dimensions.

The presence of kraft paper and excess cathode material will control the ultimate thickness of the rolled up laminate constituted by the anode, the cathode and the paper or gauze spacer, i.e., it will limit the extent to which the size of the capacitor can be reduced.

3. LEAKAGE PROBLEMS REQUIRE SEALS

In any such electrolytic capacitor, of course, there exists the risk that the liquid electrolyte will leak out. Accordingly, the capacitor must be sealed to prevent any leakage of the liquid electrolyte therefrom, since, if the liquid were to come into contact with the other electronic components encapsulated in the device, it could damage them sufficiently to cause the device to fail to operate properly. Sealing the liquid electrolyte into the capacitor thus has become standard practice, but this also requires additional volume for a terminal assembly, rubber sealing materials and other support materials.

4. DOUBLE LAYERS - TUNNEL ETCHING

Some capacitors that are incorporated in flash photography frequently utilize a double layer of anode foil between each pair of cathodes. See for example Siemens Electronic Components Bulletin V111(1973) No. 4, pp. 96–99. Such an arrangement provides more anode surface area per unit volume. However, the foil used for such construction requires tunnel etching, in which some of the pores extend right through the foil. In this case the gain in surface area is not as high as that which can be achieved with etched films that have a remaining solid section in their center. U.S. Pat. No. 5,055,975 to Behrend, although concerned primarily with particular electrolytes proposes using foil that can be roughened to increase the overall capacitance before the formation of the oxide layer such that most of the etched surface is directed towards the cathode. Pless et al. U.S. Pat. No. 5,131,388, disclosed a flat structured capacitor made of layers of aluminum anode plates, aluminum cathode plates and paper separators all enclosed in a polymeric envelope containing an electrolyte. It essentially discloses a group of electrolytic capacitors connected in parallel. Each anode comprises two anode plates welded together with an aluminum strip between them for electrical contact.

5. DOUBLE TAB CONNECTORS

Conventional photo flash capacitors include a tab for connection to the anode foil. The tab is attached to the anode by staking or cold welding in a layered construction. For double anode capacitors frequently two tabs are used, one for each anode foil. This connection methodology also wastes space and would therefore be unsuitable for use in implantable medical devices such as defibrillator. Pless et al. U.S. Pat. No. 5,131,388, disclosed a flat structured capacitor made of layers of aluminum anode plates, aluminum cathode plates and paper separators all enclosed in a polymeric envelope containing an electrolyte. It essentially discloses a group of electrolytic capacitors connected in parallel. Each anode comprises two anode plates welded together with an aluminum strip between them for electrical contact.

6. SHAPE REQUIREMENTS

Furthermore, existing photo flash capacitors are usually constructed with a cylindrical or oval cross section. Such capacitors if used in a defibrillator would place excessive lower limits on the size of the device. A 'flat' style construction is described in Coursey, Philip, R. "Electrolytic condensers" Chapman & Hall (page 86, FIG. 58 2nd edition 1939). Moresi U.S. Pat. No. 4,267,566 describes flat capacitors and Pless et al. U.S. Pat. No. 5,131,388, mentioned above, suggests flat capacitors which surround the cell in the defibrillator. The problem with such capacitors is that the cathode and anode must be kept in intimate contact requiring some clamp, which limits size reduction.

7. POLYMERIC MATERIALS WITH LIQUID ELECTROLYTES

Yoshio U.S. Pat. No. 3,555,369 attempts to achieve a reduction of the volume by means of the replacement of the conventional kraft paper spacer or insulator of the capacitor with a thin semipermeable membrane of a polymeric material. However, a capacitor according to this proposal requires that the semipermeable membrane must be impregnated with a solvent-based liquid electrolyte. Thus, the electrolytic capacitor of this patent must still be sealed hermetically in order to prevent any leakage of the electrolyte from the capacitor. Further, the presence of the liquid electrolyte in the electrolytic capacitor according to this patent will subject the capacitor to deformation of the oxide dielectric layer on the anode, and at the same time the presence of the liquid electrolyte will tend to adversely affect the lifetime of the formed oxide layer of the capacitor.

8. SOLID ELECTROLYTES

The use of solid electrolytes for electrolytic capacitors has been described in patents U.S. Pat. No. 4,942,501 U.S. Pat. No. 5,146,391 and U.S. Pat. No. 5,153,820.

9. LONG STANDING NEED FOR IMPROVEMENT

Heretofore, capacitors for non-implantable devices have not proved generally suitable for implantable defibrillator owing to the specific requirements just discussed. In a fast changing technological field of implantable pacemaker/ defibrillator there has proved to be a need for a capacitor to be designed to fulfill its role not only as a highly effective capacitor but also to conform to the requirements of size reduction and effective space utilization.

BRIEF DESCRIPTION OF THE INVENTION

According to the invention there is provided a multiple anode capacitor which incorporates three or more layers of an anode. In a preferred embodiment the capacitor for an implantable defibrillator incorporates triple anodes using a combination of tunnel etched anodes on the outer layer and a layer of highly etched foil with a solid core in the center. This arrangement allows the electrolyte and thus the conducting ions to reach the whole surface area of the triple anode layers, even pores which originate on the inner layer of the central foil, yet at the same time the ions are not able to penetrate all the way through the central foil. More layers of anode can be used in a sandwich configuration depending on the desired electrical performance. By means of these and similar multiple anode arrangements the inventors have obtained a smaller volume for the overall capacitor.

Space is also saved by inclusion of the tab for anode and cathode connection in a stack construction.

In a preferred embodiment of the present invention there is provided a capacitor containing an electrolyte formed from a polymer, which may be a solid electrolyte. The capacitor may also include a single paper separator impregnated with an electrolyte.

In an alternative embodiment of the invention an adhesive electrolyte is applied in order to eliminate the need for additional adhesives or clamps in the construction. Further details of such adhesive electrolyte are provide in co-pending U.S. application Ser. No. 08/235,179, filed May 2, 1994, and assigned to the same assignee as the present invention.

OBJECTS OF THE INVENTION

It is an object of the present invention to provide a capacitor with a triple anode construction, or even a multi anode capacitor with more than three anodes.

It is a further object of the present invention to provide a capacitor of the above mentioned type with an tab embedded in one of the anode layers.

It is a further object of the present invention, therefore, to provide novel and improved electrolytic capacitors which, by virtue of their structural features, avoid the drawbacks and disadvantages of known electrolytic and other capacitors.

It is a further object of the present invention to minimize wasted space in the defibrillator and yet maintain a physiologically acceptable shape. Thus the invention provides a capacitor with a high energy storage per unit volume and additionally achieving a mechanical outline suitable for effective packing and space utilization in a defibrillator can.

It is a further object of the present invention to provide a capacitor which may be formed in a circular, domed, or other shape suitable for packing neatly inside a chamber of a defibrillator can or other similar device.

BRIEF DESCRIPTION OF THE DRAWINGS

While the specification concludes with claims particularly defining and distinctly claiming the subject matter of the invention herein, it is believed that the present invention will be more readily understood from the following detailed description, taken in conjunction with the accompanying drawings, in which:

DETAILED DESCRIPTION OF THE PREFERRED EMBODIMENT

1. CONVENTIONAL ANODE CONSTRUCTION

Figure 1:
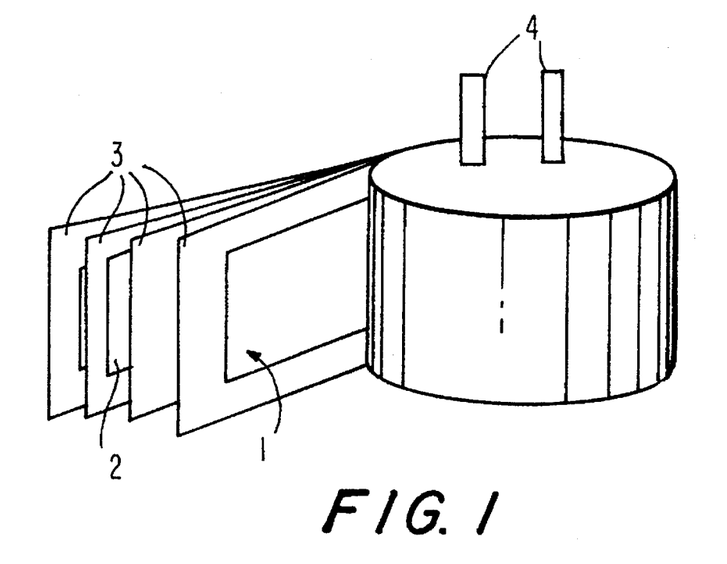
FIG. 1 and FIG. 1A depict the construction of a conventional capacitor.
Figure 1A:
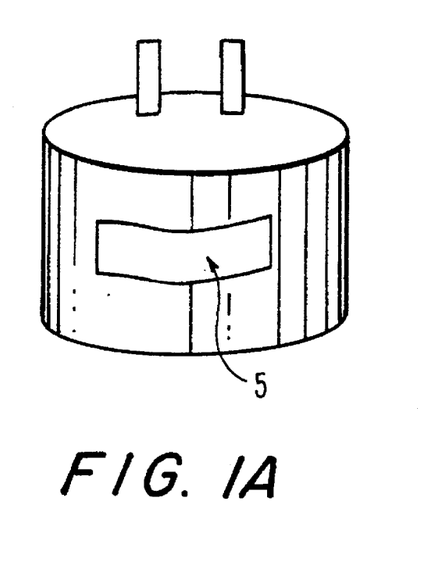

FIG. 1 and FIG. 1A depict the construction of a conventional capacitor. Anode foil 1 is wound together with cathode foil 2. These are separated by kraft paper usually in two layers 3, shown as double layers. Electrical connection is made by tab 4.

Figure 2:
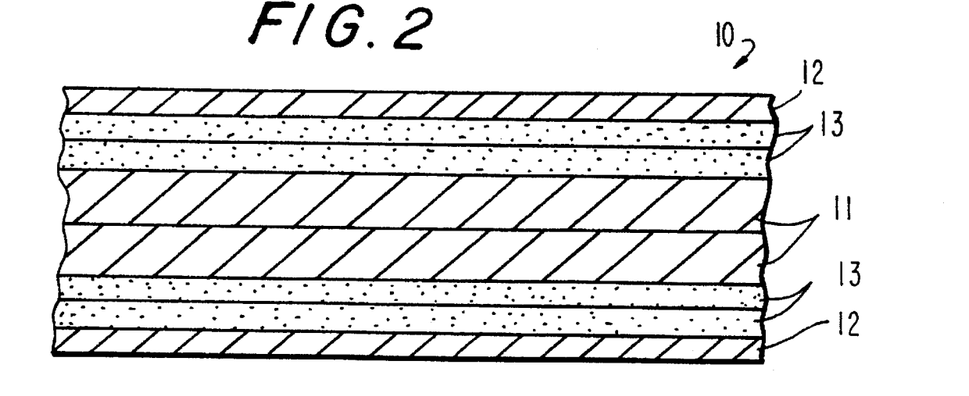
FIG. 2 depicts in cross section the layer structure of a photo flash capacitor using a double layer anode construction.

Some present photo flash capacitors use double layer anode construction. This is described in Ermer et al, Siemens Electronic Components Bulletin V111(1973) No. 4 p. 96 and illustrated in cross sectional drawing FIG. 2. The two anode plates 11 are shown separated from the cathode 12 by two layers of kraft paper 13 on each side of the anode layer.

2. TRIPLE ANODE CONSTRUCTION

Figure 3:
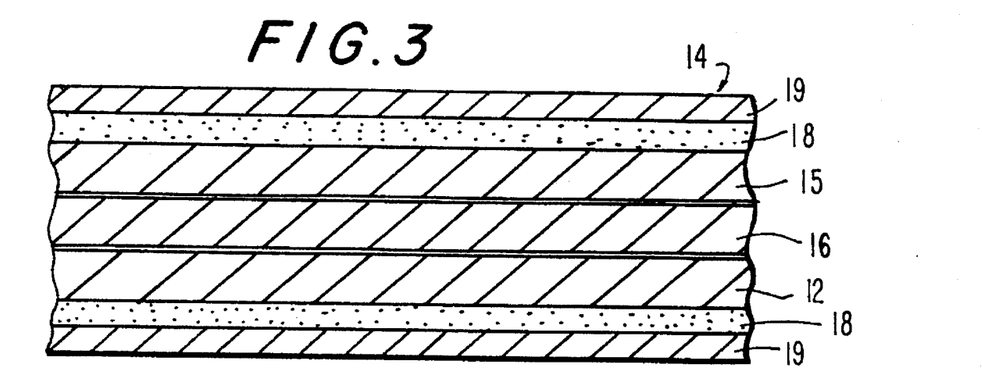
FIG. 3 depicts in cross section the layer structure of a capacitor incorporating triple anodes having a combination of tunnel etched anodes on the outer layer along with a layer of highly etched foil with a solid core in the center.

Since the device does not require the lowest possible equivalent series resistance (ESR), three or more layers of anode are utilized effectively to achieve the objects of the present invention. This is illustrated in FIG. 3. By use of triple anodes using a combination of tunnel etched anodes 15, 17 on the outer layer and a layer of highly etched foil with a solid core in the center 16 a smaller volume for the overall capacitor is achieved. This arrangement allows the electrolyte and thereby the conducting ions to reach all of the surface area of the anode, even pores which originate on the inner layer of the foil, but does not allow the electrolyte penetrate all the way through the foil.

Figure 4:
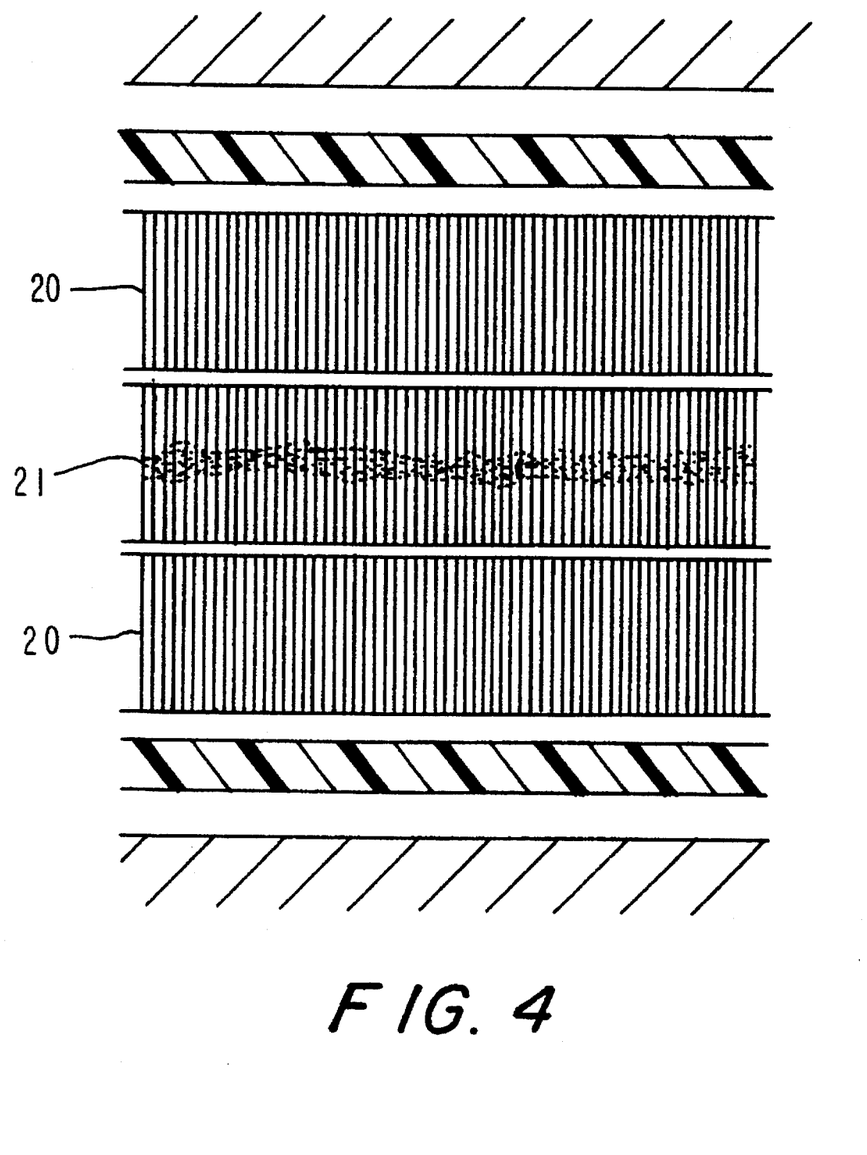
FIG. 4 depicts the etching of the anode foils of a multiple anode capacitor according to the present invention.

A more physically descriptive drawing showing the etching of the anode foils is included as FIG. 4. More layers of anode can be used in the sandwich depending on the desired electrical performance. The inventors have achieved successful results using capacitors with five layers of anode between cathode layers.

3. CONVENTIONAL TAB CONSTRUCTION

Figure 5:
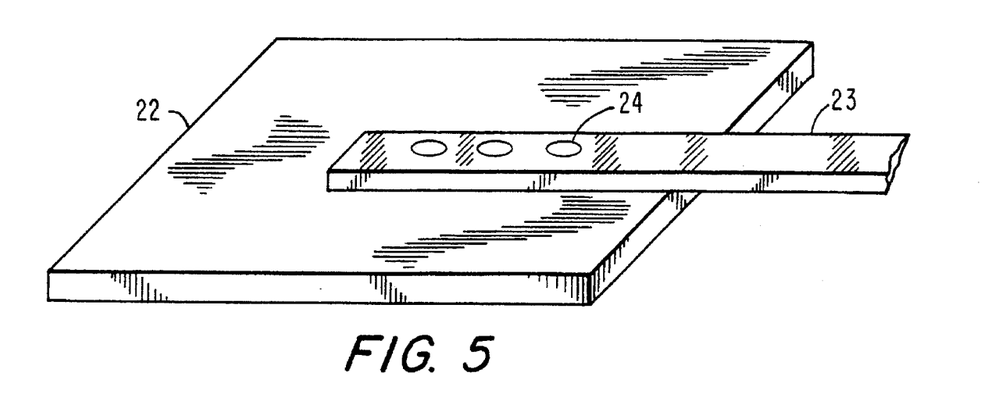
FIG. 5 illustrates the use of a tab in a conventional capacitor construction.
Figure 5A:
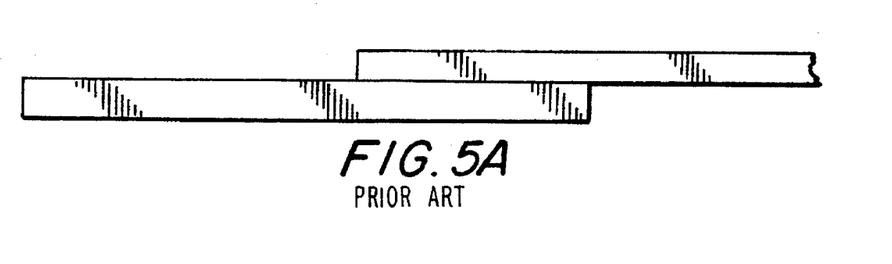
FIG. 5a illustrates a cross section of the tab and attached anode of FIG. 5.

Space is also saved by inclusion of a tab for anode and cathode connection in the stack construction. Conventional construction employing a tab is illustrated in FIG. 5 and in cross section FIG. 5a. Joining of the tab (23) is shown on the surface of each anode (22) and cathode foil and joining by stacking or cold welding (24).

4. INSERTED TAB CONSTRUCTION IN A TRIPLE ANODE STACK

Figure 6:
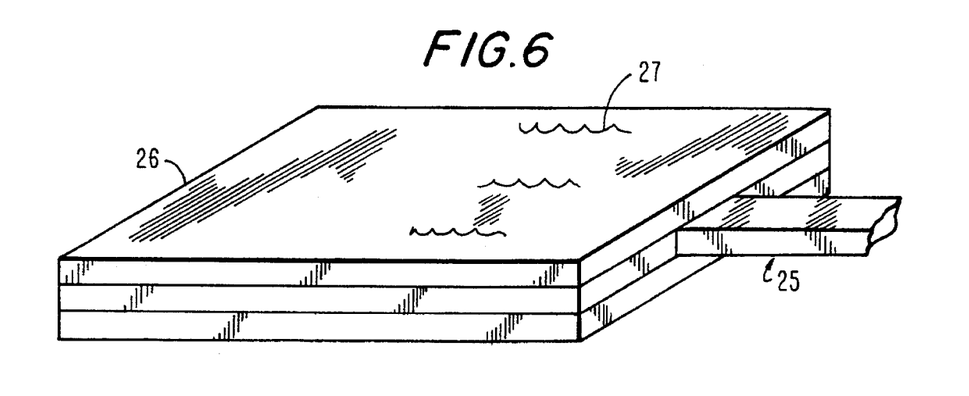
FIG. 6 illustrates an arrangement for saving space in a capacitor by the inclusion of the tab for an anode and cathode connection in the stack construction of the present invention.
Figure 6A:
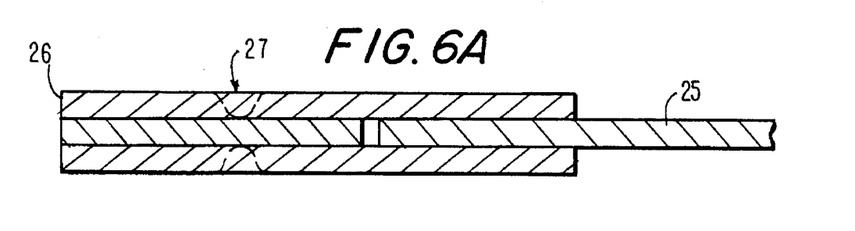
FIG. 6a illustrates a cross section of FIG. 6.

The method of the preferred embodiment inserts the tab for a small distance in the triple anode stack as illustrated in FIG. 6 and its associated cross section drawing, FIG. 6a. The tab (25) is included within the thickness of the anode stack (26) by a small cut out in any one of the layers of the triple anode. The method of the preferred embodiment employs joins between the foil material itself (27), which is preferably accomplished in the construction by cold welding. This method is a unique feature of the capacitor construction as the highly etched oxidized anode foil is brittle and difficult to join. Other joining methods such as laser and arc welding can be used.

5. FLAT CONSTRUCTIONS

Most electrolytic capacitors use a cylindrical construction. The inventors have extended the idea of the flat construction to which reference has been made previously to allow any arbitrary shape to be fabricated, consisting of as many layers as needed. These layers are cut and then folded to make a circular flat capacitor. The conducting electrolyte of the present invention can also be used for conformal bonding together of the layers of the capacitor. D-shaped, elliptical or any other shape can be produced by this method.

a. DOMED CONSTRUCTIONS

All of the plates of the structure do not have to be the same in size or shape. In this way it is possible to manufacture domed capacitors which fit into three dimensional spaces, allowing a great degree of flexibility in the internal packing of the components of the defibrillator.

6. SOLID ELECTROLYTES

The electrolyte used in the preferred capacitor may also be a solid electrolyte as disclosed in U.S. Pat. Nos. 4,942,501; 5,146,391 and 5,153,820 to MacFarlane. These have the advantage of leakage prevention. The electrolytes disclosed in copending patent application Ser. No. 235,179 filed May 2, 1994 may be used to form an adhesive as described therein.

7. PLATE STACKING

Figure 7:
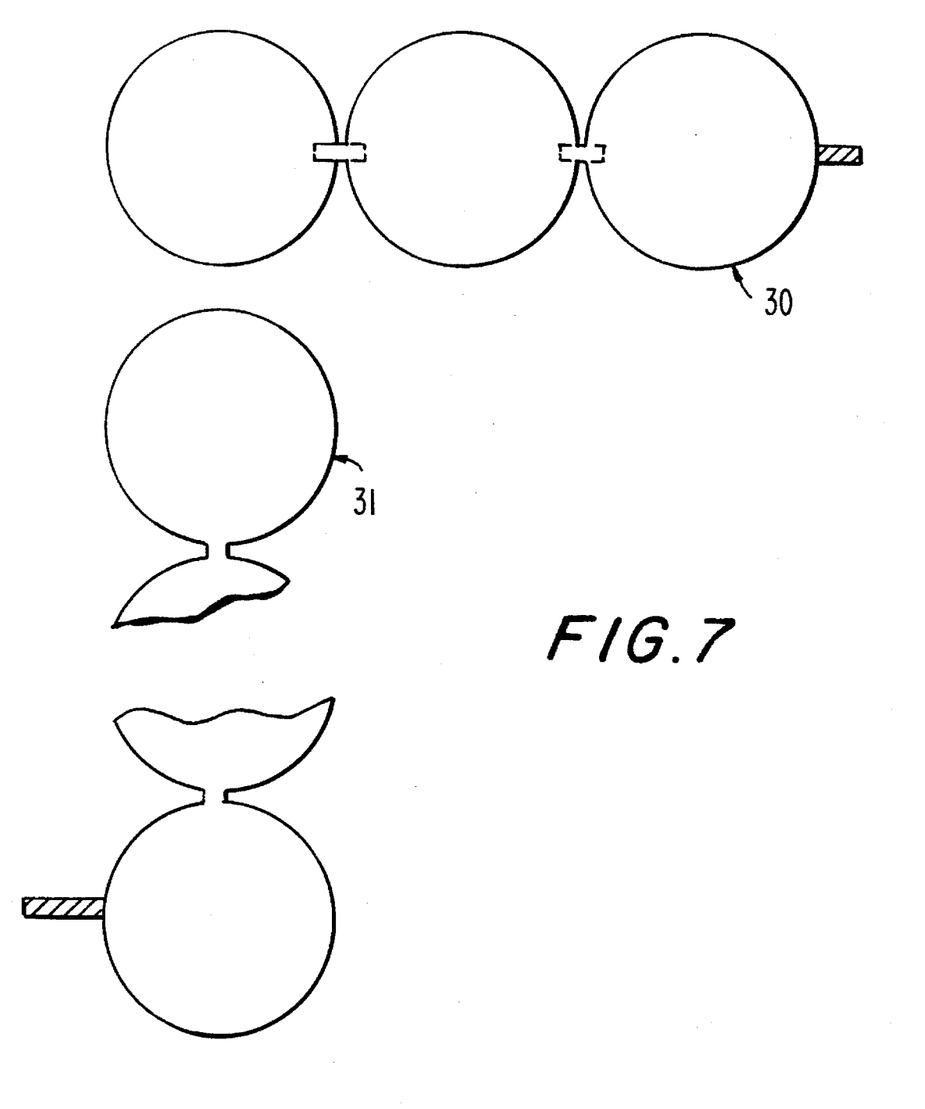
FIG. 7 illustrates the construction of round capacitors of the present invention have shaped anode, paper separator and cathode.

Plates of anodes can be stacked with the cathode and paper interweaving in many ways. Folding the cathode back and forth across layers of anode, which may also be folded, can also be used as depicted in FIG. 7.

8. USE OF FEWER LAYERS OF PAPER WITH SOLID ELECTROLYTES

Most present capacitors use two layers of paper for the separator. This is to prevent the rough edges of the anode foil penetrating the paper and causing a short between cathode and anode. The sharp edges of the tabs attached to the surface of the anode and cathode also cause points of shorting. The paper when impregnated with a conventional electrolyte becomes swollen and soft.

In the case of the present invention the paper when impregnated with the electrolyte and the electrolyte polymerized, produces a much tougher material. This can be used as a single layer thus saving volume and still giving a reliable capacitor.

9. USE OF HIGHLY ETCHED FOIL VS. TUNNEL ETCHED FOIL

The triple anode capacitor has a distinct advantage over any previous double anode capacitor in that it makes use of highly etched foil rather than solely tunnel etched foil. Highly etched foil which is not tunnel etched provides a higher level of capacitance per unit volume than tunnel etched material. The area at the bottom of the holes contributes to the increase in surface area and the holes can be smaller as they do not penetrate all the way through the foil.

a. EXAMPLE SHOWING HIGH ENERGY STORAGE

By way of example, present state of the art foil for 360 volt photo flash capacitors can be 0.87 µF/sq cm for highly etched, non porous foil and 0.76 µF/sq cm for tunnel etched foil for typical 360 volt capacitors. When a capacitor is constructed with 2 anodes of 100 µm thickness, 2 layers of paper of 20µm and cathode of 20µm, the energy density obtainable considering just this core construction is 3.28

J/cc. For a triple anode capacitor comprising three layers of anode and using highly etched foil in the center the energy density is 3.87 J/cc. However, when an adhesive electrolyte is used in the capacitor and the paper is reduced to a single layer the energy density is 4.30 J/cc.

Furthermore, the inventors have overcome the difficulties previously encountered in constructing these capacitors by devising a method of connection to the triple anode which does not waste volume. The combination of an embedded tab and an adhesive electrolyte allowing single layers of paper both enhance the advantages of the improved triple anode capacitor.

Although the invention has been described in detail in terms of a preferred embodiment, it should be understood that substitutions and modifications of the details of the preferred embodiment are included within what is entitled to patent protection. The invention is intended to be claimed as broadly as is consistent with the validity of the following claims.

What is claimed is:

1. A method for constructing an electrolytic capacitor including etching a first metal foil to form pores tunneling through said foil, etching a second metal foil to form pores on the surface of said foil and a solid core of said foil, forming an anode structure from said foils in the form of a laminate comprising an inner anode layer and at least two outer anode layers, said outer layers formed from said first foil and said inner layer formed from said second foil, impregnating said anode structure with an electrolyte, and contacting said electrolyte with a cathode layer, forming a dielectric layer of oxide on the surfaces of said anode structure.

2. The method for constructing an electrolytic capacitor according to claim 1 wherein said electrolyte is a solid polymer, and said method further comprises the step of forming said polymer by polymerization.

3. The method for constructing an electrolytic capacitor according to claim 1 further comprising preparing grooves in areas of attachment for electrical tabs and attaching said tabs seated in said grooves, wherein said tabs do not increase the thickness of the laminate in the area of attachment.

4. The method for constructing an electrolytic capacitor according to claim 1 further comprising placing a separator layer impregnated with a solid electrolyte in contact with said anode.

5. The method for constructing an electrolytic capacitor according to claim 4 wherein said layers are shaped to form a domed structure.

* * * * *